United States Patent [19]

Kirschenstein

[11] Patent Number: 5,012,340
[45] Date of Patent: Apr. 30, 1991

[54] METHOD AND CIRCUIT FOR DERIVING H AND V SYNCHRONIZING PULSES FROM A TRI-LEVEL HDTV SYNCHRONIZING SIGNAL

[75] Inventor: Reinhard Kirschenstein, Rossdorf, Fed. Rep. of Germany

[73] Assignee: BTS Broadcast Television Systems GmbH, Darmstadt, Fed. Rep. of Germany

[21] Appl. No.: 418,136

[22] Filed: Oct. 6, 1989

[30] Foreign Application Priority Data

Oct. 13, 1988 [DE] Fed. Rep. of Germany ....... 3834865

[51] Int. Cl.$^5$ .............................................. H04N 5/06
[52] U.S. Cl. ..................................... 358/150; 358/148
[58] Field of Search ............... 358/148, 150, 152, 140, 358/153

[56] References Cited

U.S. PATENT DOCUMENTS 4,639,780 1/1987 Willis .................................. 358/150
4,864,400 9/1989 Kumada et al. ................. 355/150 X

FOREIGN PATENT DOCUMENTS 2596600 10/1987 France .
0296471 12/1988 Japan .

Primary Examiner—Victor R. Kostak
Attorney, Agent, or Firm—Frishauf, Holtz, Goodman & Woodward

[57] ABSTRACT

A tri-level HDTV synchronizing pulse signal is compared with first and second reference voltages to provide pulse signals respectively containing the positive and negative pulse of the tri-level signal. A blanking signal is also derived that provides blanking after each H synchronizing pulse for more than half a line duration. It is used in correlation with the separated positive pulses of the tri-level signal to produce H frequency synchronizing pulses. The blanking signal and also another pulse signal are generated by a four bit counter which is clocked by a clock signal having four times the H frequency and has the logic 1 voltage applied to that input of the counter where it will signify the binary number 4. These signals make possible the derivation of both a picture field synchronizing pulse of vertical scanning frequency V and a frame synchronizing signal of half that frequency, a pair of D-flipflops being used to provide these outputs. The first reference voltage may be ground potential if a slightly delayed output of the separated negative pulses is used to blank out the intervals between the separated positive pulses.

5 Claims, 2 Drawing Sheets

METHOD AND CIRCUIT FOR DERIVING H AND V SYNCHRONIZING PULSES FROM A TRI-LEVEL HDTV SYNCHRONIZING SIGNAL

This invention concerns obtaining bi-level pulses from tri-level pulse signals and more particularly obtaining bi-level synchronizing signals from a tri-level television synchronizing signal.

A synchronizing signal is needed for synchronizing television equipment in a television transmission and reception chain. Usually the synchronizing signal contained in the transmitted television signal must be separated from it. The synchronizing signal consists of two parts, a horizontal part for synchronizing the line deflection and a vertical part for synchronizing the deflection necessary to spread the lines vertically. The horizontal component is formed of line frequency or H frequency pulses, also called line synchronizing pulses. The vertical component is formed of pulses of vertical scan frequency, which are also called picture field pulses. These two portions must also be separated from each other for most television equipment. Methods and circuits have become known by which in accordance with standard television transmission a synchronizing signal can be processed for separating horizontal and vertical synchronization even though the synchronizing signal has only two different levels between which the synchronizing signal jumps.

For HDTV systems, which have a high line count, synchronizing signals are favored which are able to take three different significant levels (see SMPTE Journal, November 1987, pages 1150 to 1152). The advantage of such synchronizing signals lies in the fact that they contain no d.c. components, which means that their average value is neutral (null).

SUMMARY OF THE INVENTION

It is an object of this invention to provide a method and apparatus by which a recently proposed tri-level synchronizing signal can be processed for splitting the horizontal and vertical frequency components thereof. An example of such a tri-level synchronizing signal is disclosed in my copending patent application, claiming the priority of German patent application P 38 34 259, filed Oct. 8, 1988.

Briefly, the tri-level signal is compared to reference potential (apparatus ground) to obtain a first pulse signal containing the positive pulses of the tri-level signal. A second pulse signal is obtained which includes and terminates with each positive pulse of the tri-level signal that begins a television line and remains at reference potential for more than half the duration of a television line before rising again to form the next positive pulse that includes the line-beginning positive pulse of the tri-level signal. The first and second signals are correlated to provide the H frequency synchronizing pulses. The tri-level synchronizing signal is compared with a second reference voltage more negative than the first to produce a third pulse signal containing only the negative pulses of the tri-level signal. The V frequency picture field synchronizing pulses are obtained by correlation of the second and third pulse signals to produce a fourth pulse signals such that the leading edges of the V frequency pulses will be determined by coincidence of positive pulse values of the third and fourth pulse signals and their trailing edges will be determined by coincidence of negative pulse values of the second and third pulse signals. A frame synchronizing pulse of half the V frequency is obtained by having its leading edges determined by coincidence of a positive pulse of the V frequency synchronizing signal and a positive-going edge of the third pulse signal above mentioned, while the trailing edges are determined by inverting one of the second and third pulse signals, typically the second, and then detecting the coincidence of a negative pulse of the third pulse signal and a positive-going edge of the second.

Preferably, the second and fourth pulse signals are generated by a four-bit counter clocked by a clock signal which is set by the H frequency synchronizing pulses and has a signal input for the binary number 4 connected to a voltage source corresponding to logic 1 (as distinguished from 0). The second pulse signal is then made available at a max/min output of a counter and the fourth pulse signal is available at a most significant bit output of the counter.

In terms of apparatus, the H signal is produced by a NAND gate with one input connected to a comparator that produces the above mentioned first pulse signal through a gate that "cleans" and narrows those pulses and another input connected to the max/min output and the control input of the counter (which are connected together). A pair of D-flipflops respectively provide V frequency picture field synchronizing pulses and the frame synchronizing pulses.

BRIEF DESCRIPTION OF THE DRAWINGS

The invention is further described by way of an illustrative example, by reference to the annexed drawings, in which.

DESCRIPTION OF THE ILLUSTRATED EMBODIMENT

Figure 1:
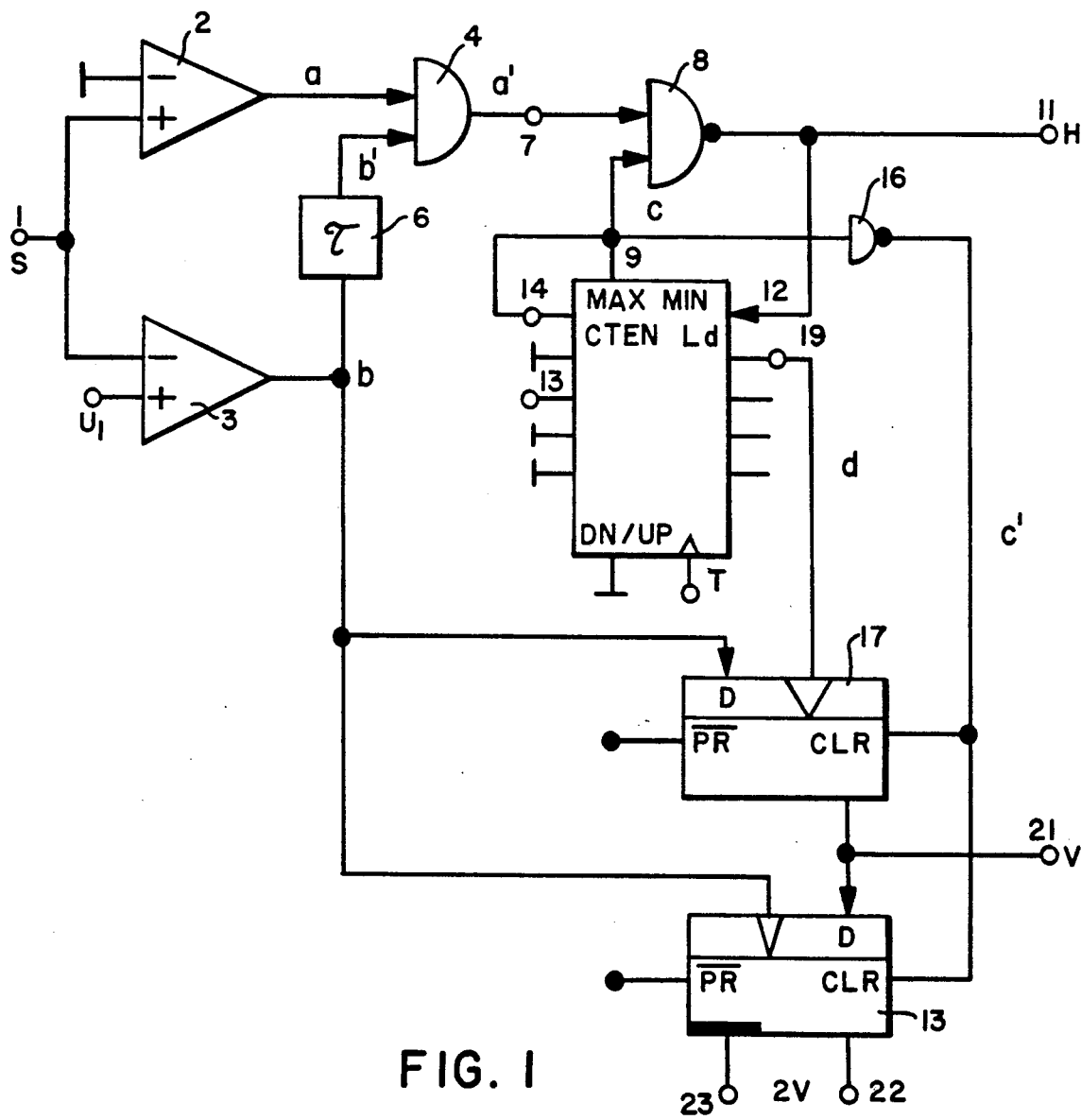
FIG. 1 is a circuit diagram of an embodiment of the invention.
Figure 2:
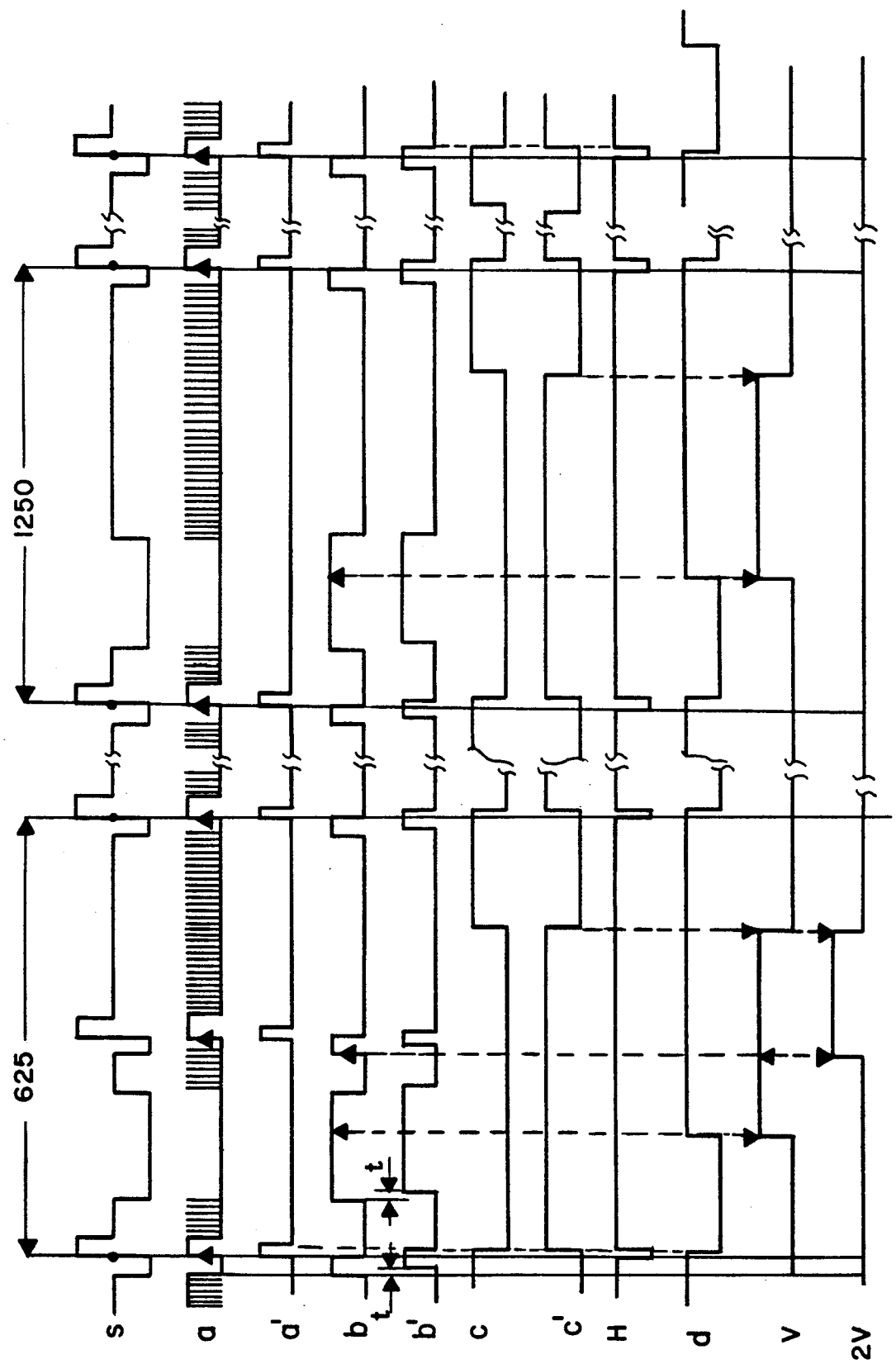
FIG. 2 is a timing diagram illustrating pulse signals which appear in the circuit of FIG. 1.

In the circuit of FIG. 1 a tri-level synchronizing signal S is supplied at the terminal 1, which is connected to the non-inverting input of a first comparator 2 and to the inverting input of a second comparator 3. The comparator 2 has its inverting input connected to reference potential, such as the potential of a grounded frame or chassis, and serves to compare the bi-level signal S with that reference potential. As a result, the pulse sequence a, shown in the top line of FIG. 2 appears at the output of the comparator 2. The vertically shaded regions between the pulses represent an undefined state of this pulse sequence a which arises from comparison of the null potential of the synchronizing signal S with the reference potential. The non-inverting input of the comparator 3 is connected with a d.c. voltage $U_1$, so that at its output only the portions b of the negative pulses of the synchronizing signal S which are more negative than the voltage $U_1$ affect the output and appear inverted at the output as shown in the fourth line designated b in FIG. 2. This signal is referred to in the summary of the invention as the third pulse signal.

In order to avoid the undefined state of the pulse sequence a at the output of the comparator 2 connected to one input of a NAND gate 4 which has its other input connected through a propagation time delay circuit 6 to the output of the comparator 3. The delay circuit 6 provides a delay of the pulse sequence b by the time t, which corresponds to somewhere between the leading edge, and the pulse middle of the narrow pulses. In this way, the AND gate 4 is opened only during the presence of the more positive level of the (delayed) pulses b' and the positive pulses of the pulse sequence a, so that at the output 7 of the gate there are pulses of the pulse sequence a' which are narrower and terminate earlier than the pulses of the sequence a. In the pulse sequence a' the regions of undefined state have been blanked out.

Of course the undefined state could have been eliminated by using a more positive reference voltage for the comparator 2, but the present circuit has the advantage that a second reference voltage source is not necessary and a single such source serves to eliminate undefined states.

Pulse sequence a' just mentioned above is then used to generate the H frequency synchronizing pulses. They are first supplied to one input of the NAND gate 8, to the other input of which the pulse sequence c is applied which is obtained from the max/min output 9 of a four-bit binary counter 10. A clock signal T is used to clock the counter 10 and has, for example, a frequency $f_T$ of about 16 times the H frequency.

Every H synchronizing pulse available at the output of the NAND gate 8 and at the output terminal 11 of the circuit of FIG. 1 is applied to the Ld input 12 of the counter 10, as a result of which the counter 10 is set at the value (for example 4) of the logic 1 voltage applied to the input 13 of the counter. The counter 10 now begins, at this value, to count a complete cycle of the clock signal (for example 12), while the output signal c of the max/min output 9 of the counter 10 remains "low" during the counting. As soon as the cycle of the count signal T is ended, the output signal c of the max/min output 9 jumps to "high". Because of the connection of the output 9 with the count enable input 14, the counting operation is then stopped. During this stopped state of the counter 10 the resulting positive pulse of the pulse signal c opens the gate 8 and in each such open period allows one pulse of the sequence a' to pass, which is at the same time inverted by the NAND gate and represents the H synchronizing pulse. The interval during which the pulse signal c is negative begins with the loading of the value 4 into the counter 10 by the horizontal pulse H and continues for the count cycle which must continue for at least half of a line interval in order to block an intermediate positive pulse in line No. 625 of the tri-level signal S which appears in the pulse signal (b).

The pulse signal c, in addition, is supplied to an inverter 16 to produce the signal c' which is supplied to the CLEAR inputs (sometimes referred to as control inputs) of the respective D-flipflops 17 and 18 which operate in succession. The output 19 (for the most significant bit) of the counter 10, at which the pulse signal d is made available (FIG. 2, third line from the bottom), is connected to the clock input of the first D-flipflop 17. The pulse signal b is supplied from the output of the comparator 3 to the data input D of the D-flipflop 17, so that by this correlation of the pulse signals b and d, a picture field frequency synchronizing pulse V will be made available at the output terminal 21 (with which the output of the D-flipflop is connected).

The synchronizing pulses V are also supplied to the D input of the second D-flipflop 18, which is clocked with the pulse signal b (referred to as the third pulse signal in the summary of the invention). This correlation of the signal b and V produces a frame frequency pulse signal 2V of half the V frequency at the outputs of the D-flipflop 18, of which the output 22 provides positive pulses and the output 23 provides corresponding negative pulses.

Although the invention has been described with reference to a particular illustrative example, it will be understood that variations and modifications are possible within the inventive concept.

What is claimed is:

1. A method of deriving H and V frequency synchronizing pulses from a tri-level HDTV synchronizing pulse signal, comprising the steps of:

comparing a tri-level HDTV synchronizing pulse signal with a first reference voltage and thereby obtaining a first pulse signal (a, a') containing the positive pulses of said tri-level synchronizing signal;

producing a second pulse signal (c) from said tri-level synchronizing signal by suppressing all negative pulses and all but the line-beginning positive pulses of said tri-level signal and causing the negative state of said second pulse signal (c) to have a duration of at least half of a television line interval;

producing H frequency synchronizing pulses by logically correlating said first pulse signal (a, a') with said second pulse signal (c) and causing each of said H frequency pulses to time the beginning of a negative state of said second pulse signal (c);

comparing said tri-level synchronizing signal with a second reference voltage ($U_1$) lying between said first reference voltage and the negative peak value of said synchronizing signal to produce a third pulse signal (b) containing only the negative pulses of said tri-level synchronizing signal;

producing a fourth pulse signal (d) for deriving picture field synchronizing pulses of V frequency by logical correlation of said second and third pulse signals (c, b), and logically correlating them and said fourth pulse signal (d) so that upon coincidence of positive pulse values of said third (b) and fourth (d) pulse signals the leading edges of said picture field synchronizing pulses are produced and the trailing edges of said picture field synchronizing signals are produced upon coincidence of negative pulse values of said second (c) and third (b) pulse signals, and producing a picture frame synchronizing signals (2V) by logical correlation of said picture field synchronizing signal (V) with said third pulse signal (b) and said second pulse signal (c) so that the leading edges of said frame synchronizing signal (2V) are produced by coincidence of a positive pulse of said field synchronizing signal (V) and a positive-going edge of said third pulse signal (b) and the trailing edges of pulses of said frame synchronizing signal (2V) are produced by inverting one of said second and third pulse signals and thereby detecting coincidence of a negative pulse of said third pulse signal (b) and a positive-going edge of said second pulse signal (c).

2. The method of claim 1, wherein said first reference voltage has a neutral reference potential and wherein prior to correlation with said second pulse signal (c), said first pulse signal (a) is correlated with a delayed third pulse signal (b) and in which the delay is such that terminal portions of the respective pulses of said first pulse signal (a) are blanked out and the intervals between the resulting pulses (a') are likewise effectively blanked.

3. The method of claim 1, wherein said second pulse signal (c) and said fourth pulse signal (d) are generated by a four-bit binary counter (10) which is clocked by a clock signal (T) and is set by said H frequency synchronizing pulses and which has a signal input for the binary number 4 connected to a voltage source corresponding to logic 1, said second pulse signal (c) being made available at a max/min output (9) of said counter and said fourth pulse signal (d) being made available at an output (19) of said counter for the most significant count state bit thereof.

4. A circuit apparatus for deriving H and V frequency synchronizing pulses from a tri-level HDTV synchronizing signal, comprising:

a first comparator (2) having a non-inverting input connected to a source of a tri-level HDTV synchronizing signal and an inverting input connected to a source of a first reference voltage, and having an output, for producing at said output a first pulse signal (a) containing the positive pulses of said tri-level synchronizing signal;

a second comparator (3) having an inverting input connected to said source of said tri-level HDTV synchronizing signal, having a non-inverting input connected to a source of a second reference voltage ($U_1$) of a value lying between said first reference voltage and the negative peak value of said tri-level synchronizing signal, and having an output, for producing at said output a third pulse signal (b) containing only the negative pulses of said tri-level synchronizing signal;

a NAND gate (8) having a first input connected to said output of said first comparator (2), having a second input and an output, for providing at said output H frequency synchronizing pulses;

a four-bit binary counter (10) having a clock input connected to a source of clock pulses (T), an LD input (12) connected to said output of said NAND gate (8), a D input (13) connected to a source of voltage corresponding to logic level 1 a max/min output (9) and a count control input (14) connected directly together and also to said second input of said NAND gate (8) and having an output (19) for providing the fourth pulse signal (d);

a first D-flipflop (17) having a clock input connected to said output (19) of said four-bit counter for said fourth pulse signal (d), a D input connected to said output of said second comparator (3), a CLEAR input connected through an inverter (16) to said max/min (9) and count control (14) inputs of said four-bit counter and an output at which said picture field synchronizing pulses of V frequency are obtainable;

a second D-flipflop (18) having a clock input connected to said output of said second comparator, a D input connected to said output of said first D-flipflop, a CLEAR input connected to said CLEAR input of said first flipflop and at least one output (22, 23) for making available synchronizing pulses of half the frequency (V) of said field synchronizing pulses.

5. The circuit apparatus of claim 4, wherein said first reference voltage is a neutral reference potential and wherein the connection of said first input of said NAND gate (8) to said output of said first comparator (2) passes through an AND gate (4) having its output connected to said first input of said NAND gate (8), a first input connected to said output of said first comparator (2) and a second input connected to the output of said second comparator (3) through a delay circuit (6) providing a delay whereby the more positive level of said third pulse signal (b) permits passage through said AND gate (4) for only respective initial portions of pulses of said pulse signal (a) and blanks out the intervals between successive pulses (a') appearing at the output of said AND gate.

* * * * *